Jan. 20, 1931. E. T. BENNINGTON 1,789,860
CARRIER SYSTEM FOR FOUNDRIES
Filed Aug. 4, 1926 4 Sheets-Sheet 3
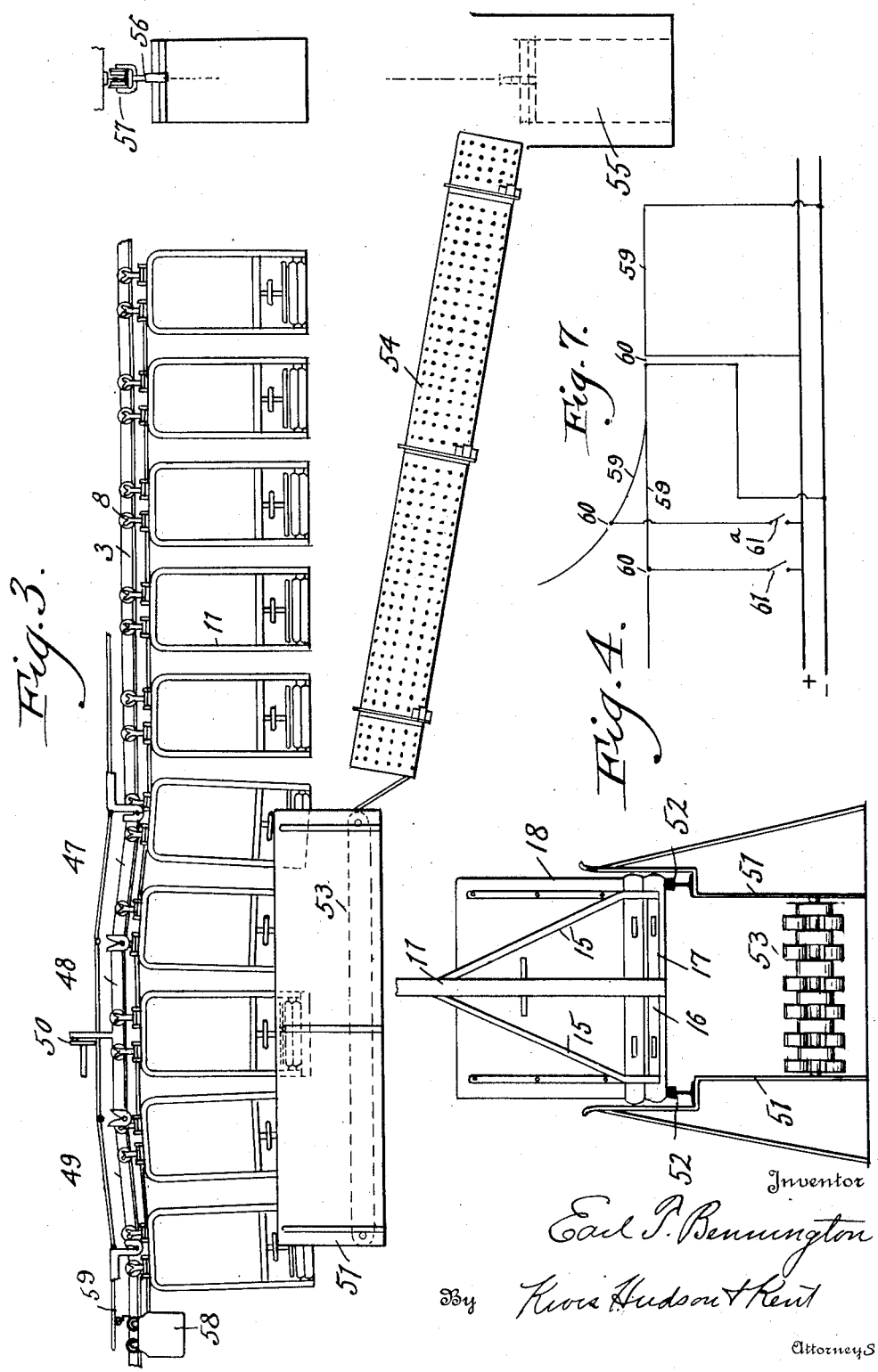

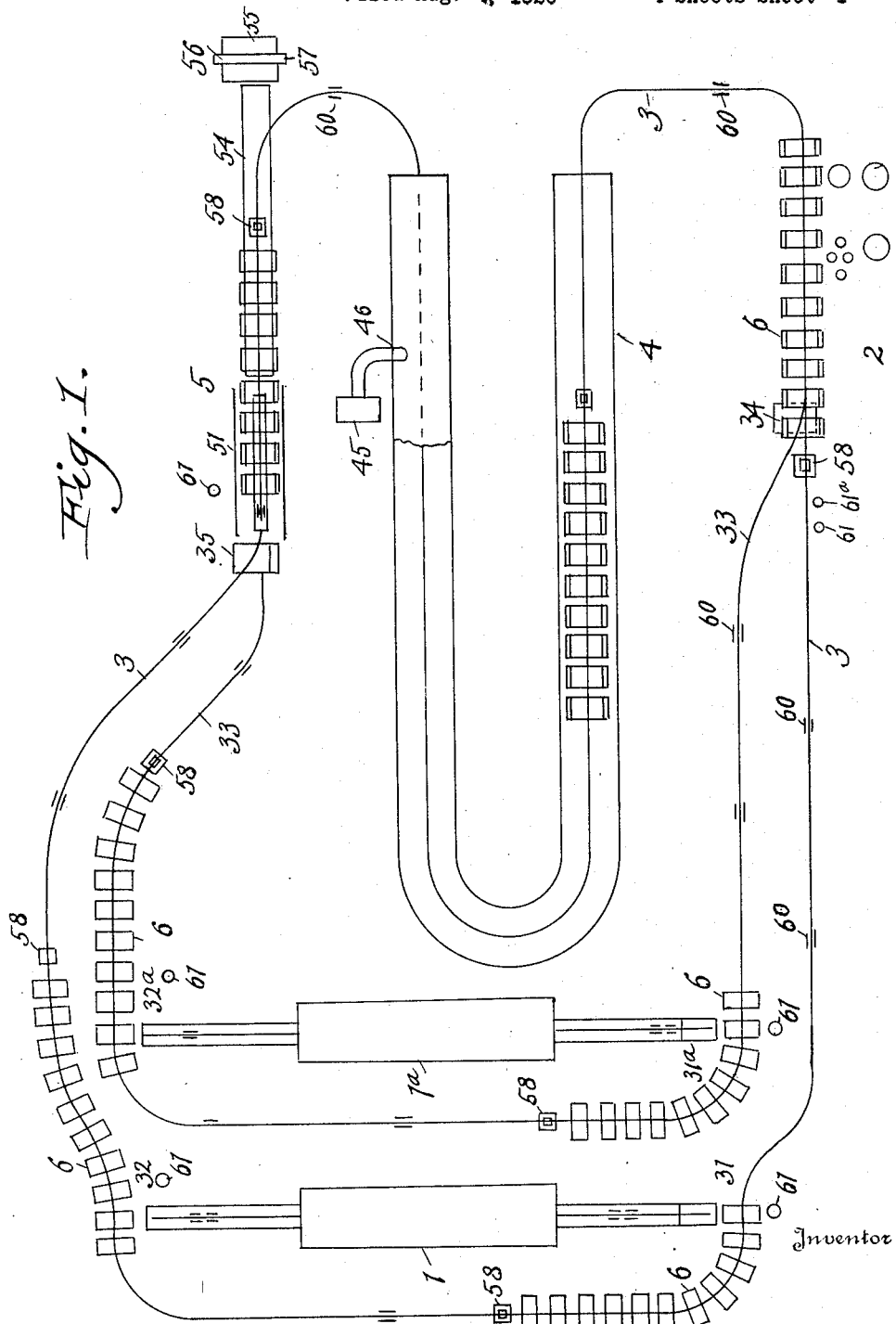

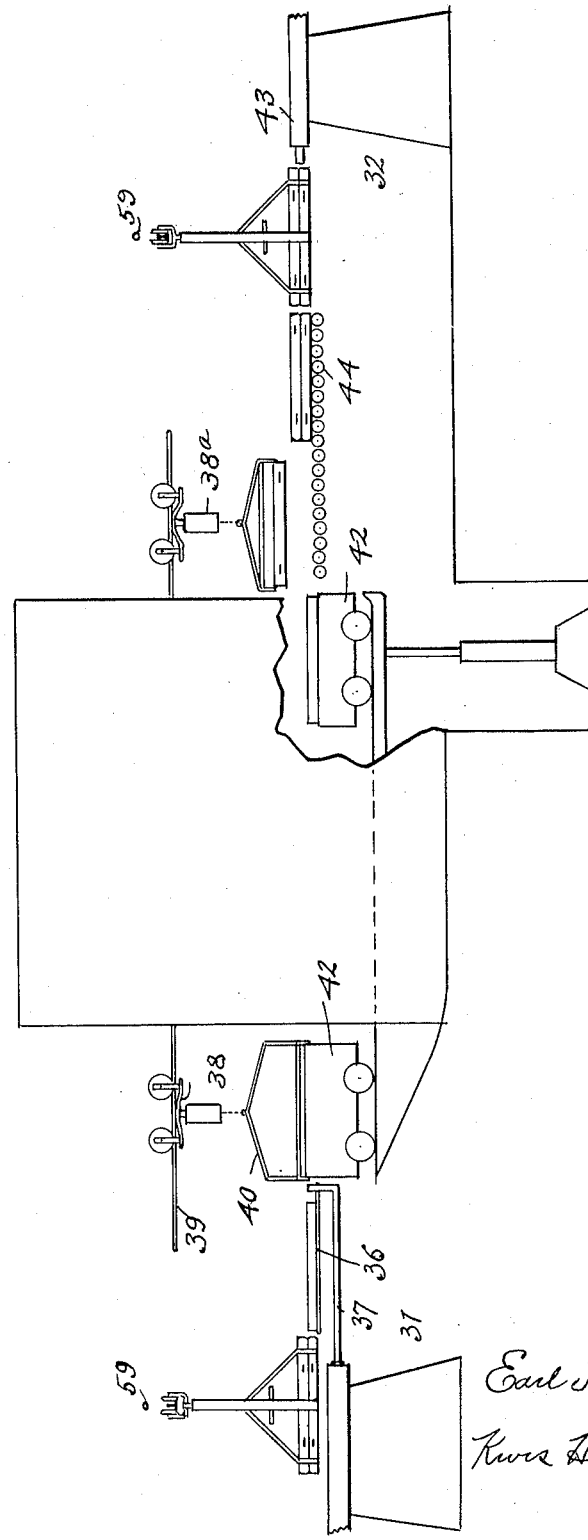

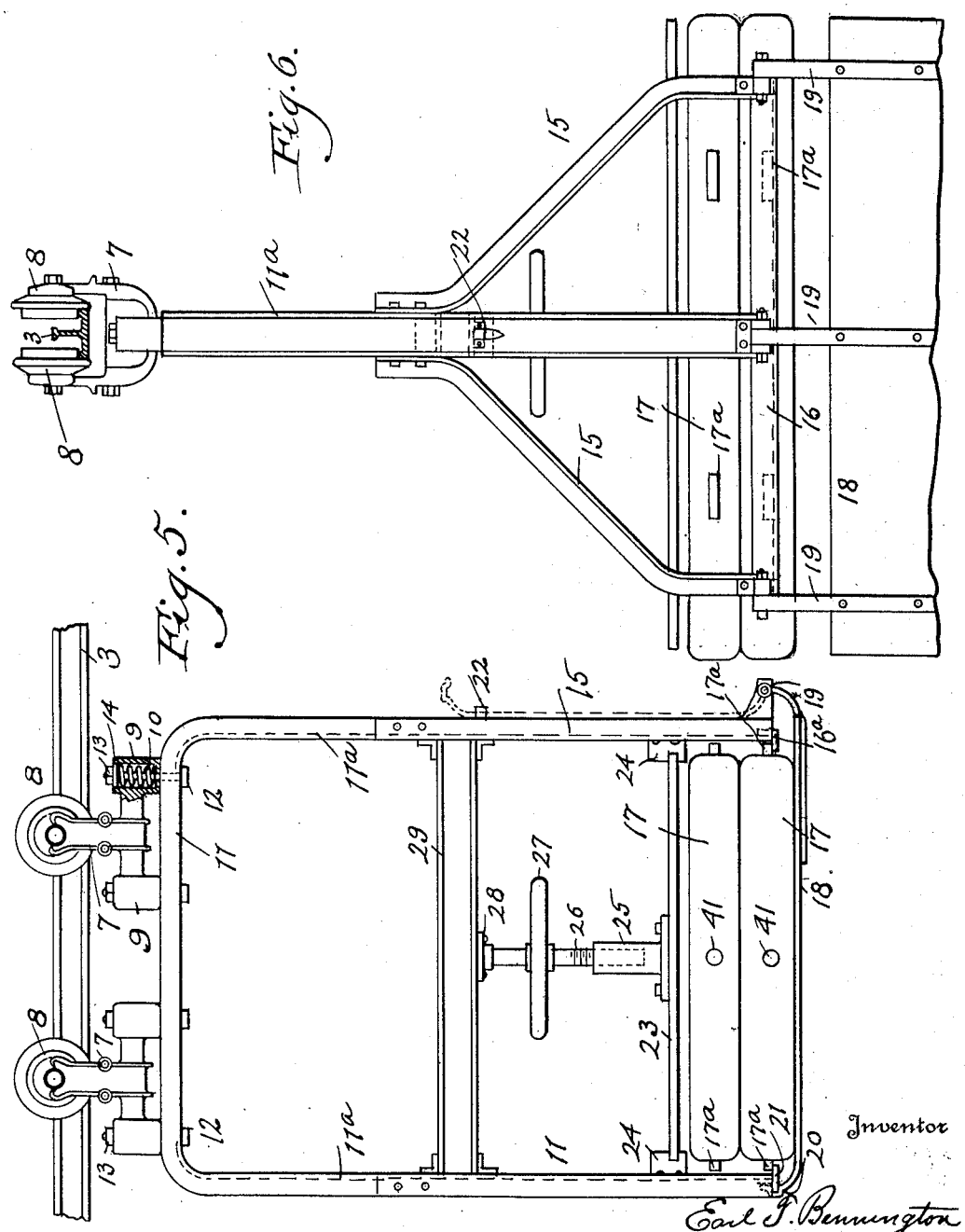

Patented Jan. 20, 1931

1,789,860

UNITED STATES PATENT OFFICE

EARL T. BENNINGTON, OF CLEVELAND HEIGHTS, OHIO, ASSIGNOR TO THE CLEVELAND CRANE AND ENGINEERING COMPANY, OF WICKLIFFE, OHIO, A CORPORATION OF OHIO

CARRIER SYSTEM FOR FOUNDRIES

Application filed August 4, 1926. Serial No. 127,081.

This invention relates to carrier systems for foundries and has for an object to provide an endless carrier system for handling the molds, in which the molds may be poured on the carriers, in which the sand forming the molds and the castings may be discharged from the flasks without removing the flasks from the carrier and by which flasks with molds thereon may be readily placed on the carriers and the empty flasks removed therefrom.

The further object of the invention is to provide an endless carrier system in which the movements of the carriers in different parts of the system is independently controlled.

A further object is to provide an overhead carrier system in which the carriers are moved by self-propelled tractors and in which the movement of the tractors of one portion of the system may be controlled independently of the movement of the tractors of the other portions of the system.

A further object is to provide a single endless carrier system adapted to handle the flasks during the pouring, cooling and discharging and to provide in addition means for handling the flasks between one or more mold forming machines and the endless carrier system.

A further object is to provide a suspended carrier which is adapted to support the flasks in position for pouring and which is so constructed that the flasks may be readily placed on or removed from the carrier.

With the above and other objects in view the invention may be said to comprise the carrier system as illustrated in the accompanying drawings, hereinafter described, and particularly set forth in the appended claims, together with such variations and modifications thereof as will be apparent to one skilled in the art to which the invention appertains.

Carrier structure illustrated but not claimed herein, is claimed in my Patent No. 1,759,183, issued May 20, 1930, on an application filed as a division of this application; and a carrier system in combination with the control means herein disclosed, is claimed in my copending application Serial No. 333,195, filed January 17, 1929, as a division of this application.

Reference should be had to accompanying drawings forming a part of this specification in which Fig. 1 is a diagrammatic plan view of the carrier system; Fig. 2 is a side elevation of a mold forming machine and the conveying means for transferring loaded flasks to the carriers and for transferring empty flasks from carriers to said machine; Fig. 3 is a side elevation of the flask discharging portion of the carrier system together with the means for conveying away the castings; Fig. 4 is an end elevation of a carrier on the flask discharging section of the trackway; Fig. 5 is a side elevation of the carrier; Fig. 6 is an end elevation of the carrier; Fig. 7 is a wiring diagram.

The carrier system of the present invention is designed to convey assembled sand molds from a mold forming machine to a pouring station, to convey the molds from the pouring station to a discharge station where the sand and cooled castings are discharged from the flasks and to return the empty flasks to the mold forming machine. As shown in Fig. 1 of the drawing the mold forming machine is indicated by the numeral 1, the pouring station by the numeral 2 and an endless trackway 3 extends around the mold forming machine 1, past the pouring station 2 through an elongated cooling tunnel 4 and past a discharge station 5. The trackway 3 is preferably an overhead monorail upon which the suspended mold carriers 6 travel. Each of the carriers 6 is provided with a pair of trucks 7, each having wheels 8 which travel upon the opposite flanges of the track rails. Each truck 7 is provided with a pair of spring receiving sockets 9 at the front and rear ends thereof, each socket having a compression spring 10 therein. The main frame member of the carrier is a channel bar 11 bent to U shape and having its base portion secured to the lower ends of the truck 7 by means of bolts 12 which pass upwardly through the sockets 9 and the coil springs 10 thereon, the upper ends of the bolts 12 being provided with nuts 13 and washers 14 bearing against upper end of the springs. The frame member 11 is thus yieldingly supported from the two trucks of the carrier in a vertical position directly beneath the track 3. The vertical side portions 11a of the frame members have angle brace bars 15 attached to opposite sides thereof and the lower ends of the brace bars 15 and side members 11a are connected by horizontal angle bars 16 which have inwardly projecting flanges 16a which serve to support the sand mold flasks. The flasks 17 are provided on opposite sides with projecting lugs 17a which are adapted to rest upon the inwardly projecting flanges 16a of the bars 16 at the lower ends of the front and rear frame members of the carriers. Two flasks 17, one containing the drag and the other the cope of the mold, are placed one on top of the other on the carrier and are supported on the carrier in position to receive the molten metal at the pouring station. In order to provide a support for the sand molds in the flasks the carrier is provided with a bottom member 18 which is connected by hinges 19 to the lower ends of the frame members 11a and 15 at one side of the carrier and which is normally held in the position in which it extends across the bottom of the carrier in engagement with the open bottom of the lower flask by means of a resilient flange 20 at its free end which engages with a retaining plate 21 secured to the lower ends of the side frame members opposite those to which the bottom members are pivoted. The bottom member 18 supports the molds during the pouring operation and during the passage of the molds through the cooling tunnel but is released by an attendant and swung to open position as the carrier approaches the discharge station so that the sand and castings may be discharged from the flasks. When the bottom member 18 is swung to open position it may be retained in a vertical position along side of the vertical frame 11a to which it is hinged by means of a suitable latch 22 which is mounted upon the outer side of the frame member and is adapted to extend through an opening in the bottom member 18.

To hold the sand mold during pouring and during cooling of the castings a clamping plate 23 is slidably mounted on vertical guides 24 on the frame members 11a above the upper flask so that it can be moved into engagement with the top of the flask after the flasks have been placed on the carrier. The clamping plate 23 has a vertical screw threaded socket member 25 secured thereto at the center thereof and threaded into this socket member there is a vertical screw 26 provided with a hand wheel 27 and having a thrust bearing 28 at its upper end which is mounted upon the under side of a rigid cross bar 29 extending between the frame members 11a. By rotating the hand wheel 27 the clamping plate 23 may be forced downwardly with the desired pressure against the top of the upper flask 17 or may be lifted out of engagement with the flask.

Loading and unloading stations 31 and 32 are provided adjacent the delivery and intake ends, respectively, of the mold forming machine where the loaded flasks are assembled and placed upon the carrier 6 and the empty flasks are unloaded from the carriers and conveyed to the mold forming machine. The carriers after leaving the discharge station 5 travel to the unloading station 32 where the empty flasks are unloaded therefrom and the empty carriers then pass along the trackway to the loading station 31 where the flasks with the sand molds thereon are assembled and loaded upon the carrier.

Where the capacity of one mold forming machine is not sufficient to supply molds at a rate as fast as is possible to pour and discharge the castings a second mold forming machine may be provided. As shown in Fig. 1 the second mold forming machine 1—a is placed within a branch track 33 which is connected by a switch 34 with the main track 3 adjacent the entrance to the pouring station and by a switch 35 with the track 3 adjacent the outlet end of the discharge station 5. The branch track 33 is provided with loading and unloading stations 31a and 32a which correspond exactly to the loading and unloading stations 31 and 32 above referred to. As many carriers as desired may be diverted from the main trackway at the switch 35 and such carriers will unload their empty flasks at the unloading station 32a and receive the loaded flasks at the loading station 31a, the loaded carriers passing to the main trackway through the switch 34 adjacent the pouring station.

For loading the flasks upon the carriers a platform 36 is provided at the loading station, the level of this platform being substantially the same as that of the horizontal flask supporting flanges 16a of the carriers. The two flasks containing the drag and cope of the mold are assembled on the platform 36 and when a carrier 6 is aligned with the platform the flasks are pushed off the platform on to the carrier by means of a suitable ram 37. The flasks are placed upon the platform 36 by means of a traveling hoist 38 which runs upon an overhead track 39 and which is provided with a bail 40 which engages with trunnions 41 at opposite sides of the flasks 17. The flask containing the cope of the molds must be inverted when placed upon the flask containing the drag and in order to permit the flask to be readily inverted the bail 40 of the hoist is so formed that it will permit a flask to be turned upon its trunnions to inverted position while it is being transferred from a carriage 42 upon which it is supported in the molding machine to the loading platform 36.

For unloading empty flasks from the carriers suitable rams 43 are provided at the unloading station 32 for pushing the empty flasks off of the carrier on to a roller bed 44 over which the flasks may be moved to the molding machine. A traveling hoist 38a, similar to the hoist 38, may be provided over the bed 44 for lifting and inverting the cope flasks.

The loaded carriers pass from the loading station to the pouring station where the molten metal is introduced into the molds and then through the cooling tunnel 4 to the discharge station, the clamping plates 23 being screwed down to engagement with the upper flask and the bottom member 18 being moved to bottom closing position before the pouring operation. Since noxious gases are given off from the molds during the cooling of the castings, means is provided for conducting these gases from cooling tunnel 4. This is done by means of a suction fan 45 connected by a pipe 46 with the cooling tunnel adjacent the outlet end thereof. As the carriers approach the discharge station 5 the bottom members 18 thereof are moved to open position to permit the sand and castings to be dislodged from the flasks. The flasks are discharged by a jarring action imparted to the carriers and to obtain this jarring action the trackway is provided with a flexible portion which is moved rapidly up and down as the carriers pass over it. This flexible portion consists of three pivoted sections 47, 48 and 49 which are connected by pivots loose enough to permit the sections to have the necessary up and down movement, the middle section 48 being connected to a suitable device for imparting reciprocating motion thereto, such as the eccentric 50. Beneath the flexible portion of the trackway there is provided a trough 51 into which the sand and castings are discharged and mounted upon the sides of the troughs 51 are rails 52 against which the bottom flasks are bumped as the carriers are moved downwardly repeatedly jarring the flasks and dislodging the sand and castings therefrom. In the lower portion of the trough 51 there is an endless chain conveyor 53 through which the sand may pass but which will support the castings which fall thereon. The conveyor 53 discharges the castings into an inclined perforated tumbling drum 54 which is continuously rotated to tumble castings and free the same from sand adhering thereto. The drum 54 discharges the castings into a receptacle 55 which is suspended from a hoist 56 which travels upon an overhead trackway 57, the trackway 57 leading to a storage place or other point to which it may be desired to deliver the castings.

The carriers are preferably moved along the trackway by means of suitable motor driven tractors 58, each adapted to propel a given number of carriers. Current being supplied to the motors of the tractors by a suitable conductor rail 59 extending alongside the trackway. Since the time required for the operations performed at the various stations may vary, it is desirable that the movement of the carriers at and adjacent each station be independent of the movement of the carriers adjacent other stations and to accomplish this result, means is provided at each of the stations for controlling the operation of the tractors on the trackway adjacent thereto. To accomplish this result the conductor rail 59 is made in sections, insulated from each other at the points indicated at 60 in Fig. 1 and current is supplied to each of the sections of the conductor rail adjacent a station independently of the sections of the conductor rail adjacent the other stations, each of the sections of the conductor rail being in an independent circuit controlled by a suitable controller switch 61, at the station past which it extends. The operator at any station by operating the controller switch 61 may advance the carriers on the portion of the trackway adjacent thereto whenever he desires, the tractor or tractors operating the carriers adjacent the station being controlled by the controller switch of said station. At the pouring station an additional controller 61a may be provided for controlling the movement of adjacent carriers on the branch track 33. The portions of the conductor rails intermediate the various stations will be supplied with current at all times so that the carriers will pass from the portions of the trackway under the control of the operator at one station to the portion of the trackway under the control of the operator at the next station.

In the operation of the system the operators at the loading stations 31 and 31a cause the carriers to advance one at a time to a position alongside the loading platforms by means of the controller switches 61 at said stations, transfer the flasks containing the cope and drag by means of the hoists 38 to the loading platforms, and push the assembled flasks by means of the rams 37 onto the carriers. The clamping plates 23 are then screwed down onto the cope flask and the bottom closure members, if not previously closed, are fastened in flask closing position.

At the pouring station the carriers are advanced step by step by operating either of the controller switches 61 or 61a at said station to bring the carriers successively to the point or points where the pouring is done. The carriers pass from the pouring station through the cooling tunnel where a constant flow of air is maintained by the suction fan 45 to cool the castings and to carry off noxious gases given off from the molds.

As the carriers approach the discharge station the bottom closure members 18 are swung to open position and latched and as the carriers pass over the reciprocating portion of the trackway the sand and castings are jarred loose from the flasks and fall into the trough 51, the sand sifting through the chain conveyor 53 and the castings being discharged through the perforated tumbling drum 54. The movement of carriers passing the discharge station may be controlled by the controller switch 61 at said station, and the proper number of carriers may be deflected to the auxiliary trackway 33 by changing the adjustment of the switch 35 from time to time. At the unloading stations 32 and 32a the operators control the movement of carriers by means for the controller switches at said stations to position the carriers with empty flasks thereon successively alongside the unloading rams which are operated as each carrier is brought into alignment therewith to unload the flasks onto the roller beds 44, the clamping plates 23 of the carriers being released before the unloading operation. The empty carriers after leaving the unloading stations pass around the mold forming machines to the loading station.

Between portions of the endless trackway adjacent the stations where the supply of current to the conductor rail is under the control of the operator, current is preferably supplied at all times to the conductor rail, as indicated in the wiring diagram shown in Fig. 7, so that a train of carriers leaving the portion of the trackway under the control of an operator at one station are caused to travel to the portion of the trackway under the control of the operator at the next station. As long a section of track as desired may be under the control of each operator so that if the work at one station lags behind that at another station the work is not immediately interrupted at the other stations since a considerable number of carriers will at all times be on the controlled portion of the trackway adjacent each station. If the work lags at any station, the fact will be indicated by the accumulation of an excessive number of carriers at the station and the work can be speeded up at this station to catch up with other stations before work is interrupted at such stations. In other words, it is not necessary that the rate at which the work is performed be exactly the same at each station to prevent delay but only necessary that the average amount of work done in a given length of time at a station be uniform. It will be apparent, therefore, that short delays occurring at any station can be made up for by speeding up the work without affecting the work at other stations, the system of the present invention having the advantage of a continuously operating conveyor system in that a certain pace is set for operations at all stations and the additional advantage that short delays at one station do not slow down operations at other stations.

Having described my invention, I claim

1. A carrier system for foundries comprising an endless trackway extending past a loading station, a pouring station, through a cooling tunnel, and past a flask discharging station and a flask unloading station, carriers on said trackway each adapted to support superposed flasks containing a sand mold, propelling means movable with carriers around the trackway, means at each of said stations for stopping carriers, and means at said discharge station between said cooling tunnel and unloading station for discharging the sand and castings from the flasks.

2. A carrier system for foundries, comprising an overhead trackway extending past a pouring station and a discharge station, suspended carriers on the trackway adapted to support flasks with sand molds therein, a cooling tunnel through which the trackway extends between the pouring station and discharge station, and means for withdrawing gases from said tunnel.

3. A carrier system for foundries, comprising an overhead trackway extending past a pouring station and a discharge station, suspended carriers on the trackway adapted to support flasks with sand molds therein, an elongated cooling tunnel through which the trackway extends between the pouring and discharge stations, and a blower having its suction inlet connected with said tunnel.

4. A carrier system for foundries, comprising an overhead trackway, extending past a pouring station and a discharge station, suspended carriers on the trackway adapted to support flasks with sand molds therein, means at the discharge station for jarring the carriers to dislodge the sand and castings from the flasks on the carriers, and means for conveying away the castings.

5. A carrier system for foundries, comprising an overhead trackway, extending past a pouring station and a discharge station, suspended carriers on the trackway adapted to support flasks with sand molds therein, said carriers having releasably held bottoms adapted to form supports for the sand molds in the flasks, and means at the discharge station for jarring the carriers to dislodge sand and castings from the flasks.

6. The combination with a pouring station, a flask discharge station and a machine for forming sand molds in flasks, of a carrier system comprising an endless trackway extending past the pouring and discharge stations and along the inlet and delivery ends of the mold forming machine, carriers traveling on said trackway and adapted to support assembled molds during the pouring operation, means at the delivery end of the mold forming machine for assembling the molds and transferring the same to the carriers, means at the discharge station for discharging the sand and castings from the flasks, and a cooling tunnel through which the carriers pass in their travel from the pouring station to the discharge station.

7. In a foundry carrier system, an overhead trackway extending past a discharge station, suspended mold carriers adapted to travel on said trackway and having means for supporting the mold flasks, and means at the discharge station for jarring the carriers by reciprocating motion thereof to dislodge the sand and casting from the flasks.

8. In a foundry carrier system, an overhead trackway extending past a discharge station, said trackway having a vertically movable section at the discharge station, suspended mold carriers adapted to travel on said trackway and having means for supporting the mold carrying flasks, and means for moving said track section up and down to jar the carriers and dislodge the sand and castings from the flasks.

9. In a foundry carrier system, an overhead trackway extending past a discharge station, said trackway having a vertically movable section at the discharge station, suspended mold carriers adapted to travel on said trackway and having means for supporting the mold carrying flasks, fixed bars beneath the carriers on the movable section, and means for moving said section up and down to bump the carriers against said bars to dislodge sand and castings from the flasks.

10. In combination, an overhead trackway comprising a vertically reciprocable portion, a suspended mold supporting carrier adapted to travel on said trackway, said carrier comprising a pair of trucks, each having wheels adapted to travel on an overhead monorail trackway, and a flask supporting frame resiliently suspended from each of said trucks.

11. In combination, an overhead trackway comprising a vertically reciprocable portion, a suspended mold supporting carrier adapted to travel on said trackway, said carrier comprising a pair of trucks, each having wheels adapted to travel on an overhead monorail trackway, springs carried by each of said trucks, and a mold carrying frame beneath said trucks and supported by said springs.

12. A carrier system for foundries, comprising an endless trackway extending past a mold loading station, a pouring station, a flask discharging station and a flask unloading station, carriers on said trackway, each adapted to support flasks containing a mold, means at the loading station for transferring an assembled mold to a carrier, means at the discharge station for discharging sand and castings from the mold carrying flasks, and means at each of said stations for controlling the movements of the carriers adjacent thereto.

13. A carrier system for foundries comprising an endless trackway extending past a mold loading station, a pouring station, a flask discharging station and a flask unloading station, carriers on said trackway, each adapted to support flasks containing a mold, means at the loading station for transferring an assembled mold to a carrier, means at the discharging station for discharging sand and castings from the mold carrying flasks, tractors movable with said carriers on the trackway for propelling said carriers along the same, and means at each of said stations for controlling the movements of said tractors on the trackway adjacent thereto.

14. A carrier system for foundries extending past a mold forming station, a pouring station, and a discharge station, groups of carriers movable on said trackway past said stations and adapted to support flasks, propelling means movable with each of said groups, power conducting means extending along said trackway, said conducting means including independent sections extending past said stations, and control means at each of said stations whereby the movement of propelling means adjacent one of said stations may be controlled independently of the movement of propelling means adjacent another of said stations.

In testimony whereof, I hereunto affix my signature.

EARL T. BENNINGTON.